United States Patent [19]

Parekh

[11] Patent Number: 4,758,366

[45] Date of Patent: Jul. 19, 1988

[54] POLYHALOGENATED HYDROCARBON REFRIGERANTS AND REFRIGERANT OILS COLORED WITH FLUORESCENT DYES AND METHOD FOR THEIR USE AS LEAK DETECTORS

[75] Inventor: Manher Parekh, Warren, Mich.

[73] Assignee: Widger Chemical Corporation, Warren, Mich.

[21] Appl. No.: 704,666

[22] Filed: Feb. 25, 1985

[51] Int. Cl.$^4$ ............... F21Y 9/06; G02B 5/22; G01M 3/04
[52] U.S. Cl. ................... 252/68; 252/589; 252/9; 252/964; 73/40; 374/4
[58] Field of Search ............ 252/964, 9, 589, 68; 374/4, 5; 73/40; 62/532

[56] References Cited

U.S. PATENT DOCUMENTS

| | | | |
|---|---|---|---|
| 1,915,965 | 6/1933 | Williams | 252/964 |
| 1,967,871 | 7/1934 | Dantsizen | 252/964 X |
| 2,393,996 | 2/1946 | Layton | 73/104 |
| 3,370,013 | 2/1968 | Labac | 252/964 |
| 3,483,735 | 12/1969 | Packo | 73/40.7 |
| 3,737,349 | 6/1973 | Levenson | 252/964 X |
| 3,770,640 | 11/1973 | Bartlett | 252/964 X |

FOREIGN PATENT DOCUMENTS 429336 5/1974 U.S.S.R. ............... 252/964

OTHER PUBLICATIONS

Merck Handbook, 10th Ed, Definition of "Rhodamine B".
Condensed Chemical Dictionary, 9th Ed., Definition of "Xanthene" and Xanthene Dye, p. 930.

Primary Examiner—John F. Terapane
Assistant Examiner—Catherine S. Kilby
Attorney, Agent, or Firm—Brooks & Kushman

[57] ABSTRACT

A leak detectable refrigeration composition including a polyhalogenated hydrocarbon refrigerant, a refrigeration oil, or a mixture of the two having a fluorescent dye dissolved therein, is prepared for use in refrigeration systems in automobile air conditioning systems, commercial refrigeration systems, and the like. Upon exposure to ultraviolet light, there is sufficient fluoresence by the refrigeration liquid to allow one to visually detect a leak in the system due to the presence of the dye at the source of the leak. Small leaks which were previously nondetectable with dye coloring systems detectable in normal light may now be detected due to the greater visibility of the flourescent dye under an ultraviolet light.

18 Claims, No Drawings

POLYHALOGENATED HYDROCARBON REFRIGERANTS AND REFRIGERANT OILS COLORED WITH FLUORESCENT DYES AND METHOD FOR THEIR USE AS LEAK DETECTORS

TECHNICAL FIELD

This invention relates to a leak detection composition and method for use with air conditioning and other refrigeration systems.

BACKGROUND ART

Daylight visible dyes have been employed to detect leaks in refrigeration systems utilizing fluorocarbon refrigerants and refrigeration oils. At the site of the leak, the escaping refrigerants and refrigeration oils containing visible dyes are detectable in normal light to a slight extent depending on the size of the leak.

Traditionally, oil soluble azo and anthraquinone dyes have been used as leak detectors in fluorocarbon refrigerants. These dyes are insufficiently stable at high temperatures such as those produced in automotive and commercial refrigeration systems. Low solubility of these dyes in the refrigerants and refrigeration oils results in clumps of dye powders being circulated through the system. Such clumps may clog the refrigeration system.

U.S. Pat. No. 1,915,965 discloses a method of testing for leaks in a refrigeration system of the compression type. Basic daylight visible dyes, such as methyl violet base, crystal violet, auramine B, rhodamine B, etc., are disclosed for use as leak detectors in refrigeration systems. These basic dyes are unstable at high temperatures and may be converted to tars which plug the system. Such basic dyes also have a low solubility in widely used refrigeration oils.

U.S. Pat. No. 4,369,120 discloses anthraquinone blue dyes for use as visual leak detectors in refrigerants, refrigeration oils, and admixtures of both. These blue dyes are visual leak indicators which readily stain surrounding areas of a leak in a refrigeration system due to their intense blue color which is differentiable from leaks of other fluid systems; e.g., red fuel oil or other colored fluids in automotive systems. The problems with these blue dyes are inherent to all visible dyes as described above.

SUMMARY OF THE INVENTION

An object of the present invention is to provide an improved leak detectable refrigeration composition including a fluorescent dye compound or composition comprising the dye dissolved within either a polyhalogenated hydrocarbon refrigerant, a refrigeration oil, or a mixture of the two. The polyhalogenated hydrocarbon refrigerant may be selected from the group consisting of
trichloromonofluoromethane,
dichlorodifluoromethane,
monochlorotrifluoromethane,
dichloromonofluoroethane,
monochlorodifluoromethane,
trichlorotrifluoroethane,
dichlorotetrafluoroethane,
1,1,2-trichloro-1,2,2,-trifluoroethane,
1,2-dichloro-1,1,2,2-tetrafluoroethane,
1,1-difluoroethane/dichlorodifluoromethane azeotrope,
chloropentafluoroethane/chlorodifluoromethane azeotrope,
chlorotrifluoromethane/trifluoromethane azeotrope,
bromotrifluoromethane,
trifluoromethane,
chloropentafluoroethane,
difluoromethane/chloropentafluoroethane azeotrope,
chloropentafluoroethane/1,1-difluoroethane azeotrope,
dichlorodifluoromethane/chlorofluoromethane azeotrope,
chlorofluoromethane/1,2-dichlorotetrafluoroethane azeotrope,
difluoromethane,
1,2-dibromotetrafluoroethane,
1,1,1-trifluoroethane,
1,1-difluoro-1-chloroethane,
1,1-difluoroethane,
bromotrifluoromethane/difluoromethane azeotrope,
1,2-dichlorotetrafluoroethane/dichlorofluoromethane azeotrope, and
hexafluoroethane/trifluoromethane azeotrope.

The refrigeration oil may be selected from the group consisting of naphthenic oils, paraffinic oils, alkylated benzenes, silicones, polyglycols, diesters or triesters of dicarboxylic or tricarboxylic acids, and polyalkyl silicate oils.

The fluorescent dye compound or composition comprising the dye may be selected from the group consisting of naphthoxanthene, perylene, naphthalene, and monocyclic aromatic compounds having an organometallic compound.

Fluorescent dyes are preferable to conventional visible dyes because exposure thereof to ultraviolet light provides fluorescence that is more readily apparent. It is also easier to differentiate fluorescent dyes from other standard daylight visible dyes used in automotive fluid systems such as engine oil fluid, transmission fluid, and coolant fluid. Fluorescent dyes are also advantageous as they are barely visible in daylight, even though readily visible under ultraviolet light. Furthermore, fluorescent dyes are non-staining because they are easily washable with aliphatic non-toxic solvents, as opposed to the toxic aromatic or chlorinated solvents required to clean visible dyes.

In accordance with the preferred composition, this invention utilizes a fluorescent dye which is stable at high temperatures up to 400° Fahrenheit, possesses sufficiently high solubility in a number of currently used refrigeration liquids, does not change the properties of oils into which it is dissolved, does not produce adverse effects on refrigeration system parts such as gaskets, compressors and the like, and may be easily differentiated from other fluid systems leak indicators. The composition of the present invention will not stain acrylic finishes, such as automotive paint, or refrigerator cabinets, as well as the skin and clothing of system operators.

As there is no need to change fluids after the leak has been repaired, the dye can coexist with system fluids without adversely affecting the refrigeration system parts. As the dye is not removed from the system, the test may be repeated to insure that the leak has been successfully repaired and that no additional leaks exist. After the leak is repaired, excess oil and dye may be removed from surface areas with any aliphatic non-toxic solvent, not requiring toxic, aromatic or chlorinated solvents.

Further, according to the invention, a method for detecting leakage in a refrigeration system comprises circulating a composition as described above through the refrigeration system and thereafter subjecting the refrigeration system to an ultraviolet light to fluoresce any dye which escapes therefrom through a leak to thereby locate the leak such that the leak can be repaired. If the leak is sufficiently large, streams of fluorescently dyed refrigerant may be seen emanating from the leak source. Traditional daylight visible dyes are not sufficiently soluble in the refrigerant to act likewise.

DESCRIPTION OF THE INVENTION

The present invention is directed to a composition useful in the detection of leaks in refrigeration systems. The composition includes a refrigeration liquid, comprising a polyhalogenated hydrocarbon refrigerant, a refrigeration oil or a mixture of the two having at least about 0.001 grams of a dissolved fluorescent dye per 100 grams of the refrigeration liquid. The fluorescent dye compound or composition comprising the dye may be a naphthoxanthene, perylene, naphthalene, or monocyclic aromatic compounds having an organometallic compound, a solution of fluorescent dye in solvent or oil, or a mixture of both. Preferably, the fluorescent dye has the structures:

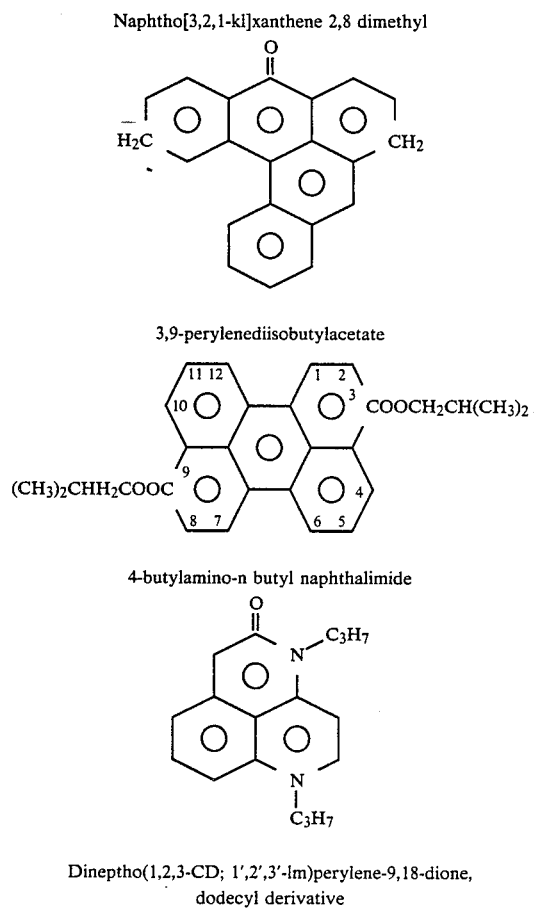

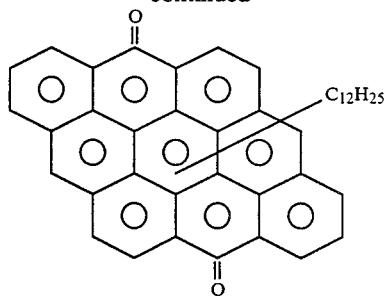

Polyhalogenated hydrocarbon refrigerants which may be used include
trichloromonofluoromethane,
dichlorodifluoromethane,
monochlorotrifluoromethane,
dichloromonofluoroethane,
monochlorodifluoromethane,
trichlorotrifluoroethane,
dichlorotetrafluoroethane,
1,1,2-trichloro-1,2,2,-trifluoroethane,
1,2-dichloro-1,1,2,2-tetrafluoroethane,
1,1-difluoroethane/dichlorodifluoromethane azeotrope,
chloropentafluoroethane/chlorodifluoromethane azeotrope,
chlorotrifluoromethane/trifluoromethane azeotrope,
bromotrifluoromethane,
trifluoromethane,
chloropentafluoroethane,
difluoromethane/chloropentafluoroethane azeotrope,
chloropentafluoroethane/1,1-difluoroethane azeotrope,
dichlorodifluoromethane/chlorofluoromethane azeotrope,
chlorofluoromethane/1,2-dichlorotetrafluoroethane azeotrope,
difluoromethane,
1,2-dibromotetrafluoroethane,
1,1,1-trifluoroethane,
1,1-difluoro-1-chloroethane,
1,1-difluoroethane,
bromotrifluoromethane/difluoromethane azeotrope,
1,2-dichlorotetrafluoroethane/dichlorofluoromethane azeotrope, and
hexafluoroethane/trifluoromethane azeotrope.

The refrigeration oils which may be used include naphthenic oils, paraffinic oils, alkylated benzenes, silicones, polyglycols, diesters or triesters of dicarboxylic or tricarboxylic acids, and polyalkyl silicate oils. When the refrigeration liquid is a mixture of polyhalogenated hydrocarbon refrigerant and refrigeration oil, the ratio of refrigeration oil to refrigerant may be in the range from about 1:3 to about 1:100.

A method according to this invention for detecting leakage in a refrigeration system is performed by adding a fluorescent dye composition solution or fluorescent dye to refrigeration oil and thereafter introducing the oil with the dye therein into a polyhalogenated hydrocarbon refrigerant of a refrigeration system.

Another method according to this invention is performed by adding a fluorescent dye composition or fluorescent dye solution into a polyhalogenated hydrocarbon refrigerant and thereafter introducing the refrigerant into the refrigeration system.

In performing both methods, the refrigeration system is operated for a period of time to thoroughly mix the fluorescent dye within the refrigeration system fluid. The system is then subjected to an ultraviolet light to fluoresce any dye which escapes therefrom through a leak. Visual inspection under the ultraviolet light will locate the leak. After the leak is repaired, excess fluid and dye may be removed from the surface area with a solvent. The refrigeration system is then operated again to insure that the leak has been successfully repaired, and that no additional leaks exist.

Yet still another method for detecting the leakage in a refrigeration system includes introducing a fluorescent dye into the refrigeration system and thereafter filling the system with sufficient refrigeration fluid to circulate through the system. The system is then operated and subjected to an ultraviolet light to locate any leaks. After detection, the leak may be repaired.

A further method for detecting the leakage in a refrigeration system includes circulating through the refrigeration system a composition as described above including a refrigerant, a refrigeration oil or a mixture of both having a fluorescent dye dissolved therein in the concentration of at least 0.001 grams per 100 grams of the refrigeration liquid.

In performing the leak detection, the refrigerant used may be selected from the group consisting of
trichloromonofluoromethane,
dichlorodifluoromethane,
monochlorotrifluoromethane,
dichloromonofluoroethane,
monochlorodifluoromethane,
trichlorotrifluoroethane,
dichlorotetrafluoroethane,
1,1,2-trichloro-1,2,2,-trifluoroethane,
1,2-dichloro-1,1,2,2-tetrafluoroethane,
1,1-difluoroethane/dichlorodifluoromethane azeotrope,
chloropentafluoroethane/chlorodifluoromethane azeotrope,
chlorotrifluoromethane/trifluoromethane azeotrope,
bromotrifluoromethane,
trifluoromethane,
chloropentafluoroethane,
difluoromethane/chloropentafluoroethane azeotrope,
chloropentafluoroethane/1,1-difluoroethane azeotrope,
dichlorodifluoromethane/chlorofluoromethane azeotrope,
chlorofluoromethane/1,2-dichlorotetrafluoroethane azeotrope,
difluoromethane,
1,2-dibromotetrafluoroethane,
1,1,1-trifluoroethane,
1,1-difluoro-1-chloroethane,
1,1-difluoroethane,
bromotrifluoromethane/difluoromethane azeotrope,
1,2-dichlorotetrafluoroethane/dichlorofluoromethane azeotrope, and
hexafluoroethane/trifluoromethane azeotrope, The refrigeration oil used in performing the leak detection may be selected from the group consisting of naphthenic oils, paraffinic oils, alkylated benzenes, silicones, polyglycols, diesters or triesters of dicarboxylic or tricarboxylic acids, and polyalkyl silicate oils.

The fluorescent dye used in this method may be one of the following types: xanthene, perylene, naphthalene rhodamine, multiple ring, monocyclic aromatic compounds having an organometallic compound, or polycyclic aromatic compounds.

Another method according to the invention is performed by dissolving a fluorescent dye in a refrigeration oil, then introducing the dye and oil into a polyhalogenated hydrocarbon refrigerant, and then introducing the refrigerant with dye and oil therein into a refrigeration system. After a certain period of operation, various portions of the refrigeration system are subjected to an ultraviolet light source to fluoresce any dye which escapes therefrom through a leak to thereby locate the leak such that the leak can be repaired.

The following examples are intended to be illustrative, and are not meant to limit the invention in any manner.

EXAMPLE 1

About 0.5 ounces of a naphthenic oil solution containing 10% Naphtho[3,2,1-kl]xanthene 2,8 dimethyl fluorescent dye was added to a 14 ounce high pressure metal can. Fourteen ounces of dichlorodifluoromethane was added to the can and the can was sealed. The contents of the can were added to an automotive air conditioning system using a charging hose having a safety valve. Sufficient dichlorodifluoromethane was then added to fill the air conditioning system, and the system was run for five minutes to insure mixing of the fluorescent dye with the refrigeration fluid. An ultraviolet light was used to scan the air conditioning system to check for leaks. Bright yellowish green fluorescence was observed at a fluid line junction indicating a leak which was thereafter repaired. The leak site was cleaned with an aliphatic cleaning solvent before the system was started again and allowed to run for five minutes. Once again, the air conditioning system was scanned with an ultraviolet light, looking for more leaks. As no fluorescence was observed, the leak of the air conditioning system has been successfully repaired.

EXAMPLE 2

A high pressure metal can similar to the one described in Example 1 was filled with 0.125 ounces of dinephtho(1,2,3-CD: 1',2',3-1m)perylene-9,18-dione, dodecyl derivative liquid dye and 14 ounces of dichlorodifluoromethane. The contents of the can were added to an automotive air conditioning system. Sufficient dichlorodifluoromethane was added to the air conditioning system to fill it before it was operated for about five minutes. The system was scanned with an ultraviolet light and a bright yellow fluorescence was observed at the front shaft seal, indicating a leak. After repairing the leak, the automotive air conditioning system was checked again as described in Example 1, and no fluorescence was observed. This indicated a successful repair.

EXAMPLE 3

A high pressure metal can similar to the one described in Example 1 was filled with 0.25 ounces of naphthenic oil solution having 25% 4, butyl amino-n butyl naphthalimide fluorescent dye therein and fourteen ounces of dichlorodifluoromethane. The contents of the can were introduced into an automotive air conditioning system of a brand new automobile in an automotive assembly plant. A recommended amount of dichlorodifluoromethane was added to the automotive air conditioning system, and allowed to run for five minutes. Ultraviolet light was used to scan the system, and a bright turquoise greenish fluorescence was observed at the junction of the refrigeration hose and the compressor, indicating a leak. The leak was repaired, and the air conditioning system was checked again as described in Example 1. No more fluorescence was observed, indicating that the leak had been successfully repaired.

While the best modes have been described in detail, those familiar with the art to which this invention relates will recognize various alternative compositions and methods for practicing the invention as defined by the following claims.

What is claimed is:

1. A leak detectable refrigeration composition comprising:
   (A) a refrigeration liquid selected from the group consisting of
      (1) a polyhalogenated hydrocarbon refrigerant selected from the group consisting of
         trichloromonofluoromethane,
         dichlorodifluoromethane,
         monochlorotrifluoromethane,
         dichloromonofluoroethane,
         monochlorodifluoromethane,
         trichlorotrifluoroethane,
         dichlorotetrafluoroethane,
         1,1,2-trichloro-1,2,2,-trifluoroethane,
   1,2-dichloro-1,1,2,2-tetrafluoroethane,
         1,1-difluoroethane/dichlorodifluoromethane azeotrope,
         chloropentafluoroethane/chlorodifluoromethane azeotrope,
         chlorotrifluoromethane/trifluoromethane azeotrope,
         bromotrifluoromethane,
         trifluoromethane,
         chloropentafluoroethane,
         difluoromethane/chloropentafluoroethane azeotrope,
         chloropentafluoroethane/1,1-difluoroethane azeotrope,
         dichlorodifluoromethane/chlorofluoromethane azeotrope,
         chlorofluoromethane/1,2-dichlorotetrafluoroethane azeotrope,
         difluoromethane,
         1,2-dibromotetrafluoroethane,
         1,1,1-trifluoroethane,
         1,1-difluoro-1-chloroethane,
         1,1-difluoroethane,
         bromotrifluoromethane/difluoromethane azeotrope,
         1,2-dichlorotetrafluoroethane/dichlorofluoromethane azeotrope, and
         hexafluoroethane/trifluoromethane azeotrope,
      (2) a refrigeration oil selected from the group consisting of naphthenic oils, paraffinic oils, alkylated benzenes, silicones, polyglycols, diesters or triesters of dicarboxylic or tricarboxylic acids, and polyalkyl silicate oils, and
      (3) a mixture of A(1) and A(2) and
   (B) a fluorescent dye compound or composition comprising the dye selected from the group consisting of
      (1) a fluorescent dye selected from the group consisting of perylene, naphthoxanthene, monocyclic aromatic compounds having an organometallic compound,
      (2) a solution of fluorescent dye in a solvent, and
      (3) a mixture of B(1) and B(2),
   wherein the fluorescent dye compound or composition is soluble in the refrigeration liquid, the concentration of said dye being at least 0.001 grams per 100 grams of said refrigeration liquid.

2. A composition as in claim 1, wherein the polyhalogenated hydrocarbon refrigerant is dichlorodifluoromethane.

3. A composition as in claim 1, wherein the refrigeration liquid is a refrigeration oil.

4. A composition as in claim 3, wherein the refrigeration oil is paraffinic.

5. A composition as in claim 1, wherein the weight ratio of refrigeration oil to polyhalogenated hydrocarbon refrigerant is in the range of from about 1:3 to about 1:100.

6. A composition as in claim 1, wherein the fluorescent dye is a naphthoxanthene compound.

7. A composition as in claim 6 wherein the naphthoxanthene compound has the following structure:

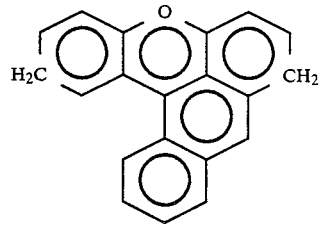

8. A composition as in claim 1, wherein the fluorescent dye is a perylene compound.

9. A composition as in claim 8, wherein the perylene compound has the following structure:

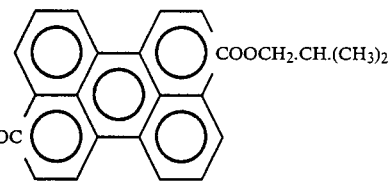

10. A composition as in claim 1, wherein the fluorescent dye is dineptho(1,2,3-CD;1',2',3'-1M)perylenedione, dodecyl derivative, and has the following structure:

11. A leak detectable refrigeration composition as in claim 1, wherein the refrigeration liquid is dichlorodifluoromethane, the refrigeration oil is napthenic oil, and the fluorescent dye composition is a naphthoxanthene compound dissolved therein.

12. A refrigeration composition as in claim 11, wherein said naphthoxanthene compound is Naphtho[3,2,1-kl]xanthene 1,8 dimethyl.

13. A leak detectable refrigeration composition as in claim 1, wherein the refrigeration liquid is dichlorodifluoromethane, and the fluorescent dye composition is a perylene fluorescent dye.

14. A leak detectable refrigeration composition as in claim 13, wherein the perylene fluorescent dye is dineptho(1,2,3-CD: 1',2',3'-1M)perylene-9,18-dione dodecyl derivative liquid dye.

15. A leak detectable refrigeration composition as in claim 1, wherein the refrigeration liquid is a mixture of dichlorodifluoromethane and a parafinnic refrigeration oil, and the fluorescent dye is dineptho(1,2,3-CD: 1',2',3'-1M)perylene-9,18-dione dodecyl derivative liquid dye.

16. A leak detectable refrigeration composition as in claim 1, wherein the refrigeration liquid is selected from the group consisting of a polyhalogenated hydrocarbon refrigerant and a refrigeration oil and the fluorescent dye composition is a monocyclic aromatic compound having an organometallic compound.

17. A leak detectable refrigeration composition as in claim 12, wherein the naphthenic oil solution having the fluorescent naphthoxanthene compound dissolved therein is combined with the dichlorodifluoromethane in a ratio of about 1 part naphthenic oil solution to about 30 parts dichlorodifluoromethane.

18. A leak detectable refrigeration composition as in claim 14 wherein the liquid fluorescent perylene compound dye is combined with the dichlorodifluoromethane in a ratio of about 1 part liquid perylene dye to about 100 parts dichlorodifluoromethane.

* * * * *